United States Patent [19]

Vega

[11] 3,983,942
[45] Oct. 5, 1976

[54] PLOWING, SOIL REFINER AND WEED OR OTHER PLANTINGS SEPARATOR MACHINE

[76] Inventor: Raul Antonio Vega, Vieytes 1386-Martinez-Pcia, Buenos Aires, Argentina

[22] Filed: Feb. 14, 1974

[21] Appl. No.: 442,366

[52] U.S. Cl. ................................ 172/32; 172/33; 171/132
[51] Int. Cl.² .................... A01B 17/00; A01B 3/00
[58] Field of Search ............... 172/32, 33, 40, 63, 172/66, 67, 68, 145; 171/122, 126, 132

[56] References Cited
UNITED STATES PATENTS

| | | | |
|---|---|---|---|
| 1,262,563 | 4/1918 | Reilly | 172/33 X |
| 1,500,437 | 7/1924 | Burton | 172/33 X |
| 2,060,688 | 11/1936 | Pryor et al. | 172/33 |
| 2,528,689 | 11/1950 | Flynt | 171/132 X |
| 2,783,698 | 3/1957 | Bambi | 172/32 |
| 2,788,725 | 4/1957 | Wilkey et al. | 172/33 |

Primary Examiner—Stephen C. Pellegrino
Attorney, Agent, or Firm—Stevens, Davis, Miller & Mosher

[57] ABSTRACT

A machine for treating soil which includes a holding structure supported on two wheels mounted centrally of the rear of said structure and two other wheels mounted on arms connected to independent hydraulic means on the sides of the front end of said structure, gang plows mounted between said wheels on said front end of said structure having weirs leading to a vibratable screen, windlasses with transversal vanes mounted above said screen to smash, crush and send backwards the soil received from the plows, breaker discs mounted in front of said plows and a side duct mounted between the rear end of said screen and the rear wheels for discarding material to the side of the machine.

6 Claims, 4 Drawing Figures

U.S. Patent    Oct. 5, 1976    Sheet 1 of 2    3,983,942
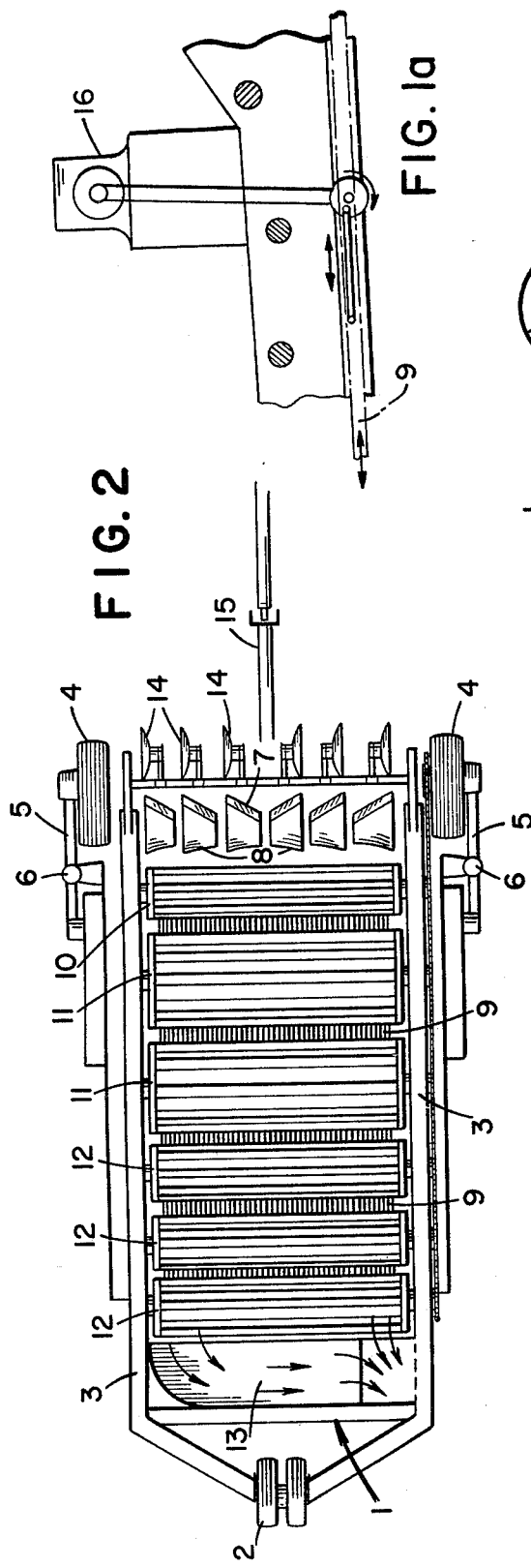
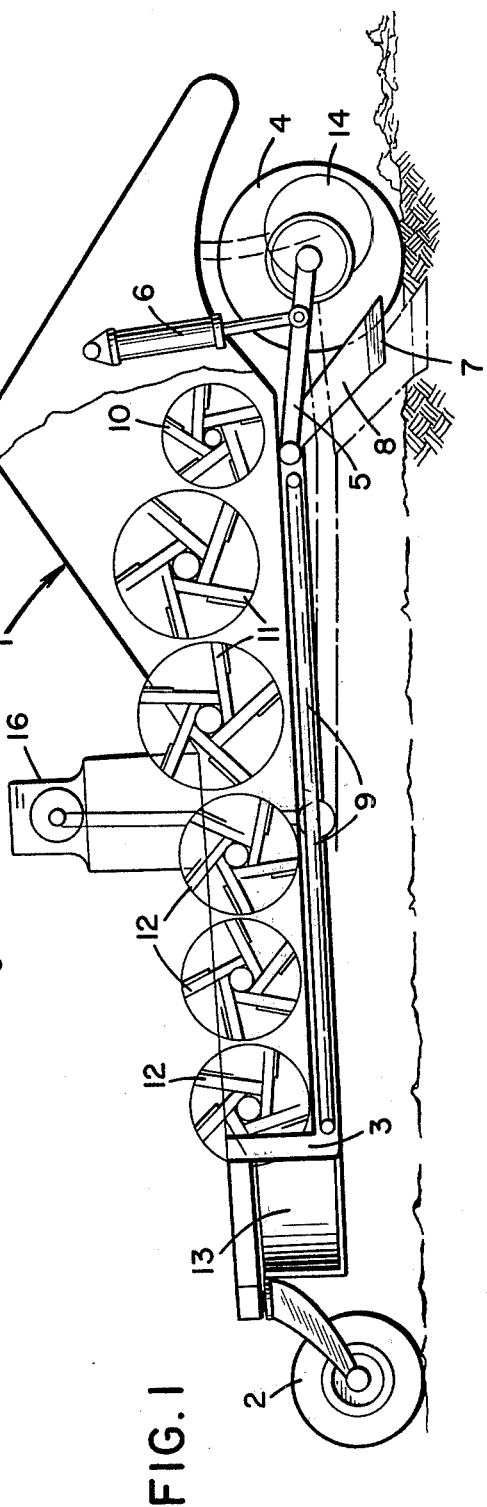

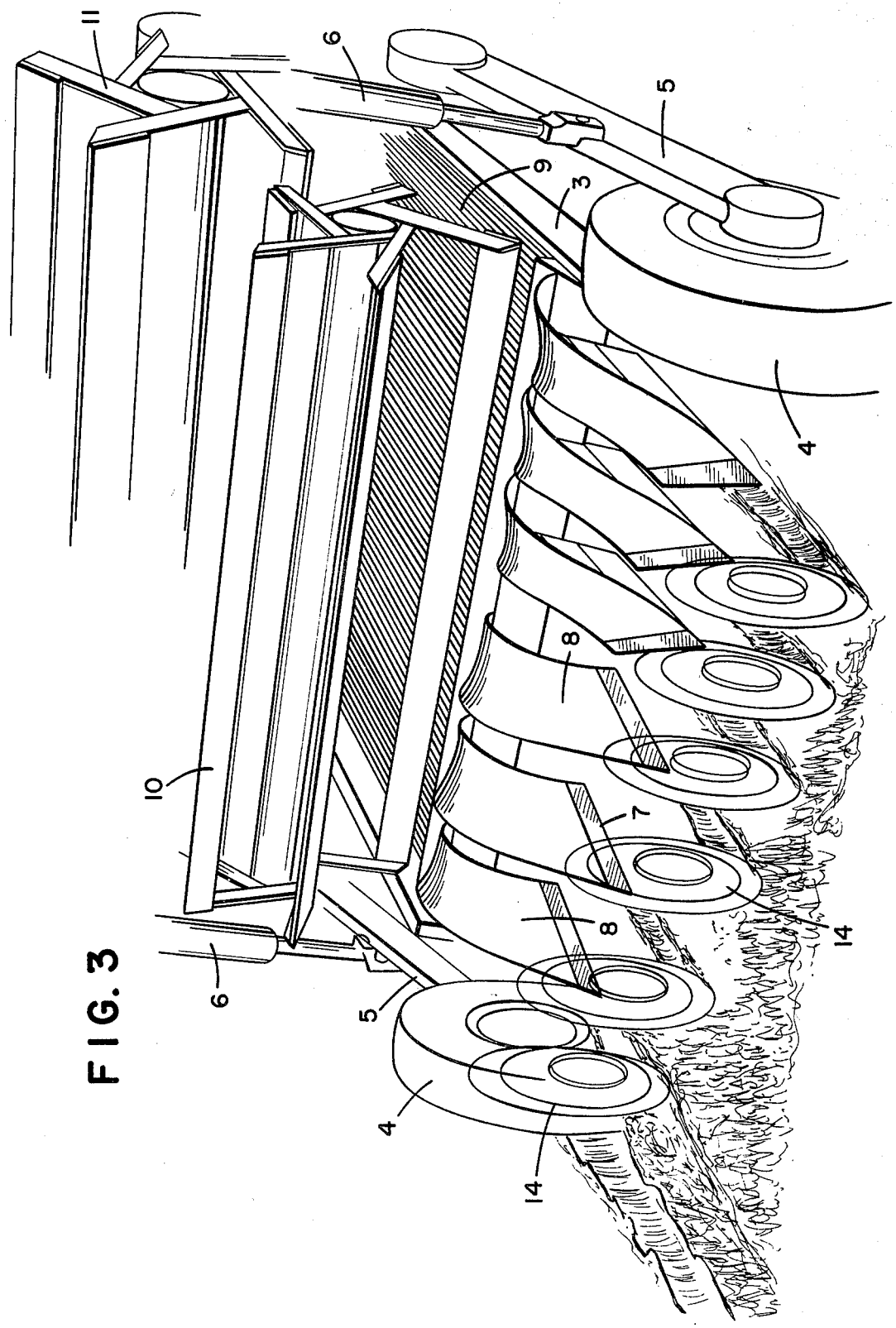

PLOWING, SOIL REFINER AND WEED OR OTHER PLANTINGS SEPARATOR MACHINE

The present invention relates to a plowing, soil refiner and weed or other plantings separator machine.

By the machine of the present invention it is possible to accomplish in a very short period of time that which before this machine required days of intense and diversified work.

It is known that the plow makes certain structure modifications in the soil that facilitate chemical biological conditions for plant growth. It is by means of plowing that one obtains the porosity needed to permit root development to destroy certain harmful plantings and to activate nutritive resources.

To obtain ideal soil conditioning, for selected or special sowings it is necessary to refine the soil, by means of other machines like weeding plows, racks, etc. Nevertheless, none of the procedures known will eliminate one of the worst vegetal plagues, i.e., the wild grass, a creeping plant that takes root through simple contact with the earth and under proper conditions of humidity grows by rhizomes. If the rhizomes are removed from the soil and cut the roots protruding therefrom grow again or develop initially when they come into contact with the earth. Therefore, it is an object of this machine, apart from the refining of the earth, to completely eliminate these weeds together with all kind of impurities, as well as the remains of other sowings.

The machine plows, crushes the earth and separates all weeds, bulbs and other elements mixed therein. The machine refines the earth by means of screens, and places in rows all alien material. These operations are accomplished at the same time, by the advancing movement of the machine being pulled by a tractor. This tractor provides the power for certain operations but the machine also has its own means to obtain power.

To better explain the present invention, reference is made to the accompanying non-limiting drawings wherein the same reference numerals identify similar or identical parts and in which:

FIG. 1 illustrates a side elevational view of the machine of the present invention;

FIG. 2 illustrates a plan view of the machine; and

FIG. 3 illustrates a partial perspective front view of the machine.

Referring to FIGS. 1 and 2 the machine is constituted by a support structure 1 with two equal wheels 2 placed in the middle of the rear part of said structure 1. Apart from a frame 3 structure 1 carries the corresponding armour that supports all mobile and motor parts. These parts are not detailed because they are subject to variation without affecting the essence of the present invention.

On both sides of the front part of structure 1 are placed the front wheels 4 assembled one on each arm 5, connected to independent hydraulic means 6 that regulate the rise and fall of said arms and, as a consequence, of said wheels. In the front part of frame 3 there is a plurality of gang-plows 7 whose weirs 8 lead to a tray formed by a vibrating screen 9 drivably connected to motor means 16 mounted on the machine. Screen 9 extends between frame 3 and a major portion of the length of the chassis of the machine and is mounted in such a way as to vibrate beneath a plurality of windlasses of which a first windlass 10 has power to push backwards the earth received from the weirs 8 of the plows 7 to the vibrating screen 9. At least two big windlasses 11 partially smash and send backwardly at the same time the material gathered while windlasses 12 complete the crushing of the remainder of the material and send at the same time weeds and alien elements towards a duct 13 that finally sends towards one side the materials that have not passed through the screens. These materials fall in rows on both sides of the machine.

Positioned before each plow share is a breaker disc 14, assigned to facilitate the plow share's work and at the same time to better align the machine's feed. The discs will be mounted on an axis or on independent arms, as may be convenient.

In operation the machine has a power intake 15 placed in its front part and connected to the cardan shaft of the tractor that pulls the machine or to any other motor means that may be convenient. Movement of the machine causes through gearing the rotation of the windlasses, while the screen that is positioned beneath the windlasses is vibrated by a motor means mounted on the machine itself.

All of these mechanisms are activated simultaneously, i.e., the front wheels 4 are being raised and lowered dependent upon the terrain, the breaker discs 14 and the plow shares 7 are being driven into the earth to an adequate depth to prepare the furrows and raise the earth to be sent through the weirs 8 towards the vibrating screen and at the same time the windlasses are rotated in which the first will push, the second two will smash the earth, and the remaining windlasses will complete the crushing. The vibrating screen will let pass only the earth divided according to a convenient granulation measure index, while weeds and any other alien material will be left on either side of the machine by means of duct 13.

Inasmuch as each front wheel is independently mounted, one of them can be lowered into one of the previous furrows in order to facilitate the alignment of the machine's feed.

What is claimed is:

1. A machine for treating soil comprising a holding structure supported on two identical wheels mounted centrally of the rear of said structure, and two other wheels mounted on arms connected to independent hydraulic means on the sides of the front end of said structure, gang plows mounted between said wheels on said front end of said structure having wires leading to a vibratable screen mounted within the bottom of said holding structure, means to vibrate said screen mounted on said structure, windlasses with transversal vanes mounted above said screen to smash, crush and send backwards the soil received from the plows, gearing means interconnecting said wheels with said windlasses to rotate said windlasses, breaker discs mounted in front of said plows and a side duct mounted between the rear end of said screen and the rear wheels for discarding material to the side of the machine.

2. The machine as claimed in claim 1, wherein the front wheels are raised and lowered independently.

3. The machine as claimed in claim 1, wherein all of said breaker discs are mounted freely on the same axis.

4. The machine as claimed in claim 1, wherein each of said breaker discs is mounted freely on an independent arm.

5. The machine as claimed in claim 1, wherein said screen extends between both sides of said structure and from the plow's weirs in the front to the side duct in the rear and obtains the power for the vibration from a motor mounted on said structure.

6. The machine as claimed in claim 1, including power means mounted on said structure to vibrate said screen.

* * * * *